(12) United States Patent
Bowen et al.

(10) Patent No.: US 12,066,976 B2
(45) Date of Patent: *Aug. 20, 2024

(54) MULTI-CORE PROCESSING AND MEMORY ARRANGEMENT

(71) Applicant: The Trustees of Dartmouth College, Hanover, NH (US)

(72) Inventors: Elijah F. W. Bowen, Hanover, NH (US); Richard H. Granger, Jr., Lebanon, NH (US)

(73) Assignee: The Trustees of Dartmouth College, Hanover, NH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/239,040

(22) Filed: Aug. 28, 2023

(65) Prior Publication Data

US 2024/0061806 A1    Feb. 22, 2024

Related U.S. Application Data

(63) Continuation of application No. 17/588,168, filed on Jan. 28, 2022, now Pat. No. 11,741,043.

(60) Provisional application No. 63/143,127, filed on Jan. 29, 2021.

(51) Int. Cl.
    *G06F 15/80*    (2006.01)
(52) U.S. Cl.
    CPC .................................. *G06F 15/80* (2013.01)
(58) Field of Classification Search
    None
    See application file for complete search history.

(56) References Cited

U.S. PATENT DOCUMENTS

| 5,706,466 A | 1/1998 | Dockser |
| 7,185,174 B2 | 2/2007 | Stewart |

(Continued)

FOREIGN PATENT DOCUMENTS

| WO | 2019023500 A1 | 1/2019 |

OTHER PUBLICATIONS

Bai, Ke, et al., Heap Data Management for Limited Local Multi-core Processors, 2010, ACM, pp. 317-325. (Year: 2010).

(Continued)

*Primary Examiner* — Eric Coleman
(74) *Attorney, Agent, or Firm* — Loginov & Associates, PLLC; William A. Loginov

(57) ABSTRACT

This invention provides a generalized electronic computer architecture with multiple cores, memory distributed amongst the cores (a core-local memory). This arrangement provides predictable, low-latency memory response time, as well as a flexible, code-supplied flow of memory from one specific operation to another (using an operation graph). In one instantiation, the operation graph consists of a set of math operations, each accompanied by an ordered list of one or more input addresses. Input addresses may be specific addresses in memory, references to other math operations in the graph, or references to the next item in a particular data stream, where data streams are iterators through a continuous block of memory. The arrangement can also be packaged as a PCIe daughter card, which can be selectively plugged into a host server/PC constructed/organized according to traditional von Neumann architecture.

20 Claims, 7 Drawing Sheets

(56) References Cited

U.S. PATENT DOCUMENTS

| | | | | |
|---|---|---|---|---|
| 7,613,882 | B1* | 11/2009 | Akkawi | G06F 12/0833 |
| | | | | 711/124 |
| 8,200,992 | B2 | 6/2012 | Felch | |
| 8,209,597 | B2 | 6/2012 | Felch | |
| 9,281,026 | B2 | 3/2016 | Felch | |
| 9,444,737 | B2* | 9/2016 | Munoz | H04L 45/742 |
| 2002/0120816 | A1 | 8/2002 | Amano | |
| 2004/0024893 | A1* | 2/2004 | Rajamony | H04L 69/163 |
| | | | | 709/250 |
| 2005/0149692 | A1 | 7/2005 | Arimilli | |
| 2010/0191999 | A1 | 7/2010 | Jeddeloh | |
| 2012/0222019 | A1 | 8/2012 | Gounares | |
| 2013/0125101 | A1 | 5/2013 | Pamer | |
| 2014/0237477 | A1* | 8/2014 | Cadambi | G06F 9/5044 |
| | | | | 718/103 |
| 2015/0058857 | A1* | 2/2015 | Sandstrom | G06F 9/4881 |
| | | | | 718/107 |
| 2015/0162100 | A1 | 6/2015 | Motwani | |
| 2016/0170725 | A1* | 6/2016 | Holton | G06F 8/451 |
| | | | | 717/157 |
| 2016/0173104 | A1 | 6/2016 | Vassiliev | |
| 2018/0292988 | A1* | 10/2018 | Wang | G06F 11/3037 |

OTHER PUBLICATIONS

Cheng, Sheng-Wei, et al., Many-Core Real-Time Task Scheduling with Scratchpad Memory, 2016,IEEE.pp. 2953-2966. (Year: 2016 ).

Choi, J et al., Executing Synchronous Dataflow Graphs on a SPM-Based Multicore Architecture .2012, ACM, pp. 664-671. (Year: 2012).

Orphanoudakis, T. et al., Embedded Multi-core Processing for Networking, 2018 CRC process Chapter 12 of publication entitled Multi-core Embedded Systems,pp. 399-463. (Year: 2018).

Venkataramani, V., et al., Scratchpad-Memory Management for Multi-Threaded Applications on Many-Core Architectures, 2019, ACM, pp. 10:1-10:28. (Year: 2019).

* cited by examiner

```
data1 = array of size N
data2 = array of size N
for i = 1 to N-1
    a = data1 [ i ] * data2 [ i ]
    b = a + data2 [ i + 1 ]
```

MULTI-CORE PROCESSING AND MEMORY ARRANGEMENT

RELATED APPLICATION

This application is a continuation of co-pending U.S. patent application Ser. No. 17/588,168, entitled MULTI-CORE PROCESSING AND MEMORY ARRANGEMENT, filed Jan. 28, 2022, which claims the benefit of U.S. Provisional Application Ser. No. 63/143,127, entitled MULTI-CORE PROCESSING AND MEMORY ARRANGEMENT, filed Jan. 29, 2021, the teachings of which are herein incorporated by reference.

FIELD OF THE INVENTION

This invention relates to computer processing and memory architectures using a multi-core arrangement.

BACKGROUND OF THE INVENTION

Typical computing devices (servers, PCs, laptops, etc.) are constructed using a current conventional (e.g.) von Neumann architecture. This generally consists of a traditional processor/CPU, such as those commercially available from Intel, AMD, Qualcomm, etc. The CPU is interconnected with a dynamic random access memory (DRAM) or similar "memory" arrangement that provides a working memory for data processes performed by the CPU. In the original von Neumann design this was provided by a tape drive or magnetic core memory. The CPU also contains an arithmetic logic unit (ALU) and processor registers. More generally, such architecture is characterized by (a) a control unit that contains an instruction register and program counter, (b) memory that stores data and instructions (c) external mass storage for data (typically) not currently being operated upon by the CPU and (d) input and output mechanisms.

The typical design also defines that a processor core has a few memory slots called "registers", and code, consisting of a set of atomic operations, with a relation amongst them (in von Neumann code, the relation is an ordered list). The code is a mix of three important types of atomic operations:
  (a) "load"—copy memory (at address A) into a register;
  (b) "store"—copy a register into memory; and
  (c) manipulations/"math"—manipulate the data in registers (e.g. sum two numbers together).

In this type of architecture, operations must be loaded from memory, which generally use a single massive memory store (or, address space). To avoid using a single memory store for all operations, one must define limits on which operations may share memory (e.g. two operations that cannot share memory may use separate memory stores). Hence the traditional von Neumann architecture encounters several theoretical or practical bottlenecks, including, but not limited to the facts that (a) operations themselves must be loaded from memory, which takes up substantial throughput capacity; (b) since the required memory address space is voluminous, the mere finding of content consumes a large block of processor time—and during this latency/delay, the content at this address cannot be used (analogous to pulling a randomly selected book off the shelf at the Library of Congress); (c) since the memory is voluminous, it typically cannot fit on the same silicon die as the CPU arrangement, hence necessitating a physically constrained bus (e.g. copper trace) interface between the CPU and memory arrangement. Contemporary architectures literally cannot fit sufficient wires to support high-bandwidth communication. An example of this is high-bandwidth memory (known as "HBM2"), which is higher bandwidth than commercially available GDDR6 memory because the manufacturing process is revised to increase the physical size of the wiring interface.

Based upon the disadvantages above, computing processors/CPUs dedicate a substantial quantity (often >90%) of their transistors to "caches", which provide copies of memory content that is predicted to be needed again soon by an active process, effectively providing a scratchpad. Notably, reading from cache is substantially faster than reading from memory. However, if the required memory content is not in the cache, the architecture must take the full memory latency to retrieve the content, plus the time spent checking the cache. Because the memory latency is different based upon whether or not the data being accessed is in-cache, memory latency becomes variable and unpredictable. This unpredictability adds a further challenge to writing code because it cannot be designed such that memory content arrives in register exactly when it is needed—because the arrival itself cannot be predicted accurately. A disadvantage to a cache-based architecture is that transistor count is a major element in the cost of processor manufacture, and the cache increases the transistor count by an order of magnitude.

FIG. 1 shows a typical von Neumann processing arrangement 100 by way of example. The arrangement 100 provides a plurality of processor cores/CPUs 110, which are served by a data cache structure 112, all instantiated on a common or single die 120. The number of cores 110 and size of the cache 112 are variable within the limits of the silicon die parameters and/or fabrication techniques. Notably, the memory (e.g. DRAM) 130 is located off the die 120, and interconnected via an appropriate bus architecture 140.

Unstructured parallelism (e.g. multi-core CPUs and hyperthreading) runs multiple sets of code simultaneously, sharing a monolithic memory. Unstructured parallelism boosts performance per-dollar by combining multiple processor "cores", or code-executing electronic circuits, into a single product. However, such unstructured parallelism suffers worse from memory bottlenecks, because the single memory is being used by multiple cores. Single-instruction-multiple-data ("SIMD") operations advantageously reduce the aforementioned issues by executing a single instruction on multiple datums. In operation, SIMD executes a single load to get the instruction for multiple addresses of memory content. Often, a single SIMD load/store operation operates on a larger contiguous region of memory, allowing architectures to take advantage of predictable load/store addresses (only within a SIMD operation—there is limited predictability between operations). A single SIMD operation may be executed in parallel across multiple cores. Memory contents addressed within the same SIMD operation (say, addresses A and B) are assumed to possess simple structured relationships—for example, A will not be read in the process of computing on B, and vice-versa. Recent examples of SIMD instruction sets are Intel's AVX-512, NVIDIA's CUDA, and OpenCL.

Notably, and by way of further background, CUDA is more flexible than a simple instruction set, in that CUDA consists of an instruction set, a compiler, and a list of higher-level programming interfaces. Moreover, a CUDA kernel is a long string of instructions that can be executed in parallel on a large list of data and CUDA can be described as having structured parallelism that goes beyond the simple SIMD model. That is, CUDA has parallel or sequential parallelism (but never both). Also. A CUDA kernel can execute N operations in parallel on each input and a CUDA kernel cannot pass the output of intermediate operations on input A as input to later operations performed on input B. Instead, the intermediate output must be written to main memory, then reloaded by a second kernel. It is noted that NVIDIA has recently introduced CUDA Graphs, which allows low-level programmers to specify an arbitrary flow of data through operations (not limited to parallel-OR-sequential parallelism). However, despite various advantages, NVIDIA graphics processing units (GPUs), which utilize CUDA, cannot optimally execute these graphs, because they still possess a monolithic memory. Also, disadvantageously, SIMD (and CUDA) instructions are too simple and inflexible to efficiently execute many modern parallelizable algorithms and cannot capture most restrictions on the flow of data through a code base (set of operations). For example, there is no way to communicate to any aforementioned architecture that a small set of operations is going to execute repetitively.

Hence, prior art computing architectures and associated data handling schemes retain various disadvantages, and even SIMD architectures often contain the same elements as serial processors (large cache, off-die memory, . . . ), so SIMD architectures still possess most of the downsides of serial processors.

SUMMARY OF THE INVENTION

This invention overcomes disadvantages of the prior art by providing a computer processor architecture and associated memory that employ a computer multi-core distributed memory (MCDM) architecture in a manner that efficiently distributes processing and memory functions across a silicon die in a manner that more optimally allows execution of instructions using certain programming techniques, such as CUDA Graphs. This technique enables low-level programmers to specify an arbitrary flow of data through operations (not limited to parallel-OR-sequential parallelism).

In an illustrative embodiment, a multi-core processing system, and method for programming and use herein, provides a generalized electronic computer architecture with multiple cores, memory distributed amongst the cores (a core-local memory). This arrangement provides predictable, low-latency memory response time, as well as a flexible, code-supplied flow of memory from one specific operation to another (using an operation graph). In one instantiation, the operation graph consists of a set of math operations, each accompanied by an ordered list of one or more input addresses. Input addresses may be specific addresses in memory, references to other math operations in the graph, or references to the next item in a particular data stream, where data streams are iterators through a continuous block of memory. More particularly, according to an exemplary embodiment, the system and method can be arranged so that core-local memory is an "autonomous module" as described in the above-incorporated Published PCT application WO 2019/023500 A1. In an embodiment, the arrangement can be free of caches. As such, local memory is read at L1 cache latencies. The arrangement can also be packaged as a PCIe daughter card, which can be selectively plugged into a host server/PC constructed/organized according to traditional von Neumann architecture. Additionally, the arrangement's compiler can operate on the host's processor. Code stored and run on the host is used to initiate compilation and computation. Also, operations can be based on an existing (e.g. RISC) instruction set. As such, math operations are specified using standards, such as IEEE 754. It can be advantageous to simplify the ALU by limiting the set of math instructions, optimizing for low transistor count and high throughput. A smaller ALU tangibly increases the number of cores that fit on a certain die, thus increasing the total processing power. An operation graph can be communicated to the cores through store operations to specific, pre-reserved false memory addresses. Also, memory content and operations can be communicated to the multi-core processing arrangement from a von Neumann processor through a standard (e.g. PCIe) interface.

The source of the operation graphs can vary. For example, software converts SIMD operations to operations written in a compatible instruction set. Alternatively, existing APIs (e.g. map-reduce, TensorFlow, NumPy) can be recreated as operation graphs, and users can use the system and method's own APIs as drop-in replacements for existing ones. These implementations can be binary-equivalent, but can run more efficiently due to the advantages of the illustrative system and method.

In an illustrative embodiment, the computing system comprises a plurality of processing cores, each having a discrete, respective, core-local memory associated therewith interconnected in a manner that provides potentially unlimited bandwidth for data transfer therebetween, so as to define a plurality of respective core-memory pairs. The core-memory pairs are further interconnected to each other by switching arrangements and a data bus that enable data transfer between the various core-memory pairs in the overall architecture. The core-memory pairs defined herein need not be a distinct physical instance, but rather can be on different physical locations on the die and interconnected by a bus therebetween. The core-memory pairs are also substantially free of caches—in comparison to current conventional (e.g. von Neumann) processor/memory arrangements—for data transferred between each of the processing cores and core-local memory, respectively. Such a substantially cache-free architecture enables generally low-latency and high-throughput memory I/O without (free of) relying on purpose-built and/or larger-volume caches, associated with conventional architectures. It further enables high-predictability memory latency to application software that chooses to make use of it. Illustratively, at least one of the core-memory pairs is located on either a single die or separate dies. The processing cores can be constructed and arranged to operate a code-supplied flow of core-memory pairs from one specific operation to another using an operation graph. The operation graph can comprise a set of mathematical operations, each accompanied by an ordered list of one or more input addresses. The input addresses can also comprise specific addresses in memory, references to other math operations in the graph, or references to a next item in a data stream. As such the data streams can be iterated through a continuous block of the core-local memory. The core-memory pairs can be defined by an autonomous module (see below) arrangement. The die containing a plurality of the core-memory pairs can be mounted on a PCIe daughter card, which is adapted to be selectively plugged into a host server/PC having a host processor constructed according to a traditional von Neumann architecture. A compiler for program data can be processed by the core-memory pairs. The compiler can operate, on at least one of (a) one or more of the core-memory pairs and (b) the host processor. Illustratively, program data stored with respect to, and operating on, the host processor can be adapted to initiate compilation and computation. The core-memory pairs can operate based upon an operation graph and a source of the operation graph can be based upon (a) program data that converts SIMD operations to operations written in a predetermined instruction set, and (b) existing APIs that are recreated as operation graphs, and for which new APIs are used as drop-in replacements for the existing APIs.

BRIEF DESCRIPTION OF THE DRAWINGS

The invention description below refers to the accompanying drawings, of which.

DETAILED DESCRIPTION

I. Design Considerations

Figure 1:
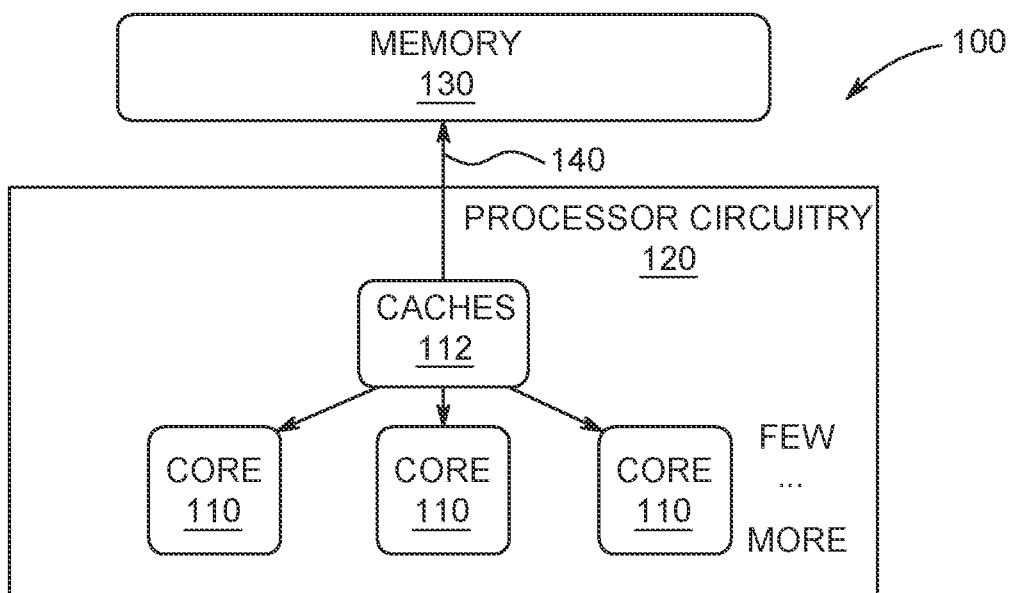
FIG. 1 is a block diagram showing a typical multi-core processor arrangement with on-die cache and off-die working memory according to a prior art, von Neumann processor architecture.

Neuromorphic computers are non-von-Neumann architectures inspired by the human brain. The brain is an organ that operates in extreme parallelism, while employing a generalized "clock rate" (i.e. transfer of data between neurons) that is effectively more than 100,000 times slower than a contemporary silicon processor. Notably, the brain stores memory at the locations of computation, not separately. In practice, neuromorphic computers employ a variety of arrangements in an attempt to emulate operations of the brain. Some arrangements eschew digital transistors in favor of analog computation. Some employ memristors, or other electronic components, in place of transistors, so as to store the previous state of a switch across time, and some use traditional digital transistors, but redesign the architecture such that multiple cores are wired in sequence/series (as well as in parallel).

In the context of designing a neuromorphic computer, it is recognized that field programmable gate arrays (FPGAs) are increasingly used as an alternative to GPUs for high-performance parallel computing. Such FPGAs are programmable circuits, which means that many processes/algorithms can be rewritten in custom hardware and run on FPGAs instead of compiled into an instruction set and run on a von Neumann processor. FPGAs also offer maximal flexibility, and are far easier to redesign than application-specific integrated circuits (ASICs). However, FPGAs are wasteful, in that to produce flexibility, the FPGA circuitry typically contains many elements that are not used by any particular circuit design. Also disadvantageously, FPGAs do not currently possess enough spare transistors to construct/enable sizeable on-die memory.

A variety of other current, alternate computer architectures include but are not limited to the following platforms: (a) Mythic AI, which provides hybrid analog and digital calculations with substantially robust memory integration. This platform is designed to surpass the performance of GPUs in deep learning (e.g. convolutional neural networks (CNNs)), training and/or enterprise-scale real-time testing; (b) Wave Computing's Triton AI (MIPS/RISC); (c) Amazon's AWS Inferentia; (d) Google's Tensor Processing Unit; (e) ARM Ethos Machine Learning Processor; (f) Intel's Habana, which is designed to run pre-trained deep networks in real-time embedded settings; (g) Intel's Movidius Vision Processing Unit (Intel Neural Compute Stick 2) (h) Apple's Bionic chips and (i) ARM's Trillium. Likewise, the following teachings are provided by way of background on the problems considered herein, which are incorporated by reference: U.S. Pat. No. 8,200,992, entitled PARALLEL PROCESSING COMPUTER SYSTEMS WITH REDUCED POWER CONSUMPTION AND METHODS FOR PROVIDING THE SAME; U.S. Pat. No. 8,209,597, entitled SYSTEM AND METHOD FOR ACHIEVING IMPROVED ACCURACY FROM EFFICIENT COMPUTER ARCHITECTURES; and U.S. Pat. No. 9,281,026, entitled PARALLEL PROCESSING COMPUTER SYSTEMS WITH REDUCED POWER CONSUMPTION AND METHODS FOR PROVIDING THE SAME; and Published PCT Application No. WO 2019/023500 A1, ENTITLED COMPUTER-IMPLEMENTED PERCEPTUAL APPARATUS.

II. Multi-Core Processor and Memory Arrangement

Figure 2:
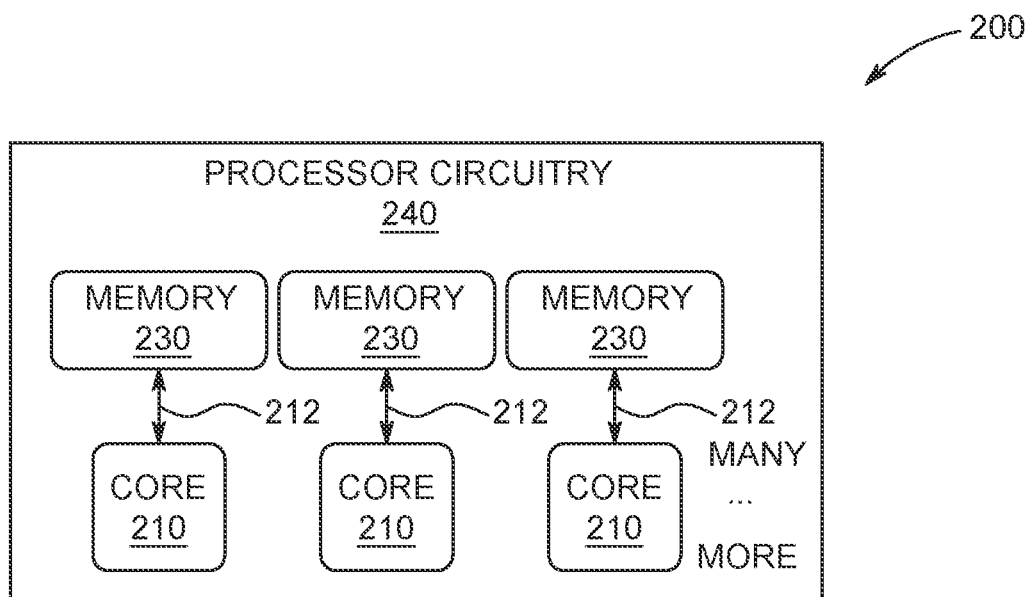
FIG. 2 is a block diagram showing a computer multi-core distributed memory (MCDM) on-die processor architecture according to an illustrative embodiment.

Reference is made to FIG. 2, which shows a generalized arrangement 200 for a multi-core distributed memory (MCDM) and associated processor architecture, including a plurality of CPU cores 210, each served by a directly connected (busses 212) memory 230, all of which are fabricated on the same, discrete silicon (semiconductor) die 240, according to an illustrative embodiment. Note that such a memory arrangement cam also be termed a "core-local memory". The processor and memory pairs 210, 230 are discretely provided. As described below, the pairs 210, 230 can be tied by appropriate on-die switching arrangements to an appropriate external bus architecture, such as PCI Express (PCIe), which allows interconnection with external memory storage devices, such as a disk drive and/or solid state storage. As described below pairing of processor and core-local memories can be based upon bus interconnection, and not based upon physical proximity on the die.

Note, while the processor core and memory arrangement is depicted on a single die in the illustrative embodiment, it is expressly contemplated that the processor core and memory can be provided in separate dies or chips in alternate implementations. In an alternate implementation, each core can be provided on a chip or die and a physical (wire trace in the form of (e.g.) bus 212) interface with effectively unlimited bandwidth can be wired between the core and memory. Hence, this description should be taken broadly to include such arrangements and the term "unlimited bandwidth" should be taken to refer to an on-die or off die connection between the core and the memory that transfers data therebetween effectively as fast as the connected components can handle such transferred data.

Figure 3:
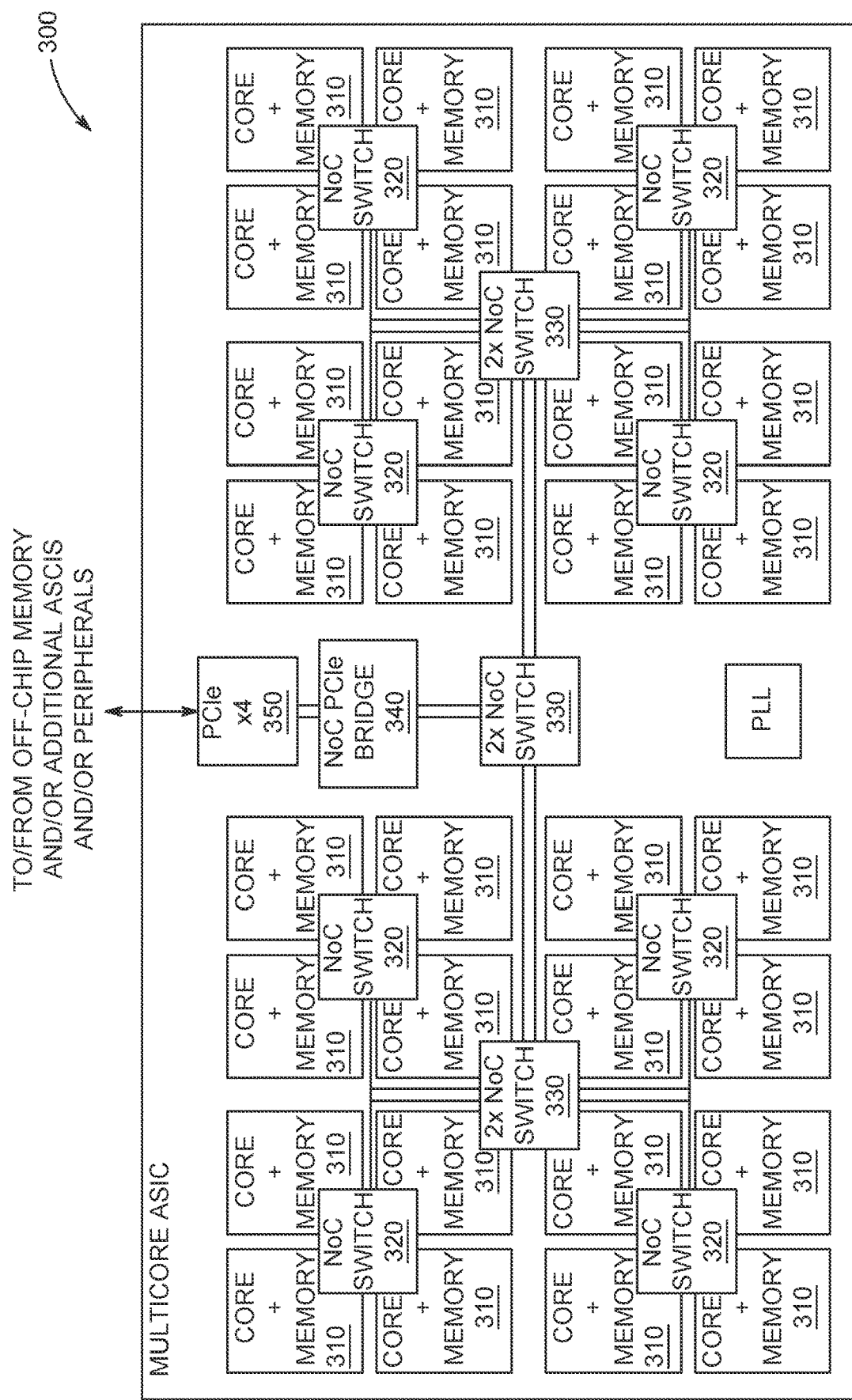
FIG. 3 is a diagram showing an exemplary arrangement of processors shown in FIG. 2 arranged on a single ASIC chip, more particularly showing an exemplary embodiment utilizing an H-tree inter-core network structure.

Referring to FIG. 3, an overall multi-core ASIC 300 constructed in accordance with the principles of FIG. 2 is shown in further detail. This ASIC represents a single chip or die for purposes of fabrication. The depicted ASIC 300, by way of non-limiting example, includes a plurality (e.g. 32) discrete CPU and memory pairs 310 that are shown arranged in clusters of (e.g.) four, each served by a switch architecture 320. The clusters of four CPU/core-local memory pairs are served by another, second level switch architecture 330. The switches allow the various cores to be accessed in a predetermined order for performance of operations. The second level switches 330 are interconnected to a PCIe bridge architecture 340 that adapts the core data to the PCIe bus standard and allows communication off-chip via the bus 350. Note that an exemplary embodiment herein utilizes an H-tree inter-core network structure. Other network structures can be employed in alternate embodiments, including structures that do not employ (are free of) NoC switches.

Figure 4:
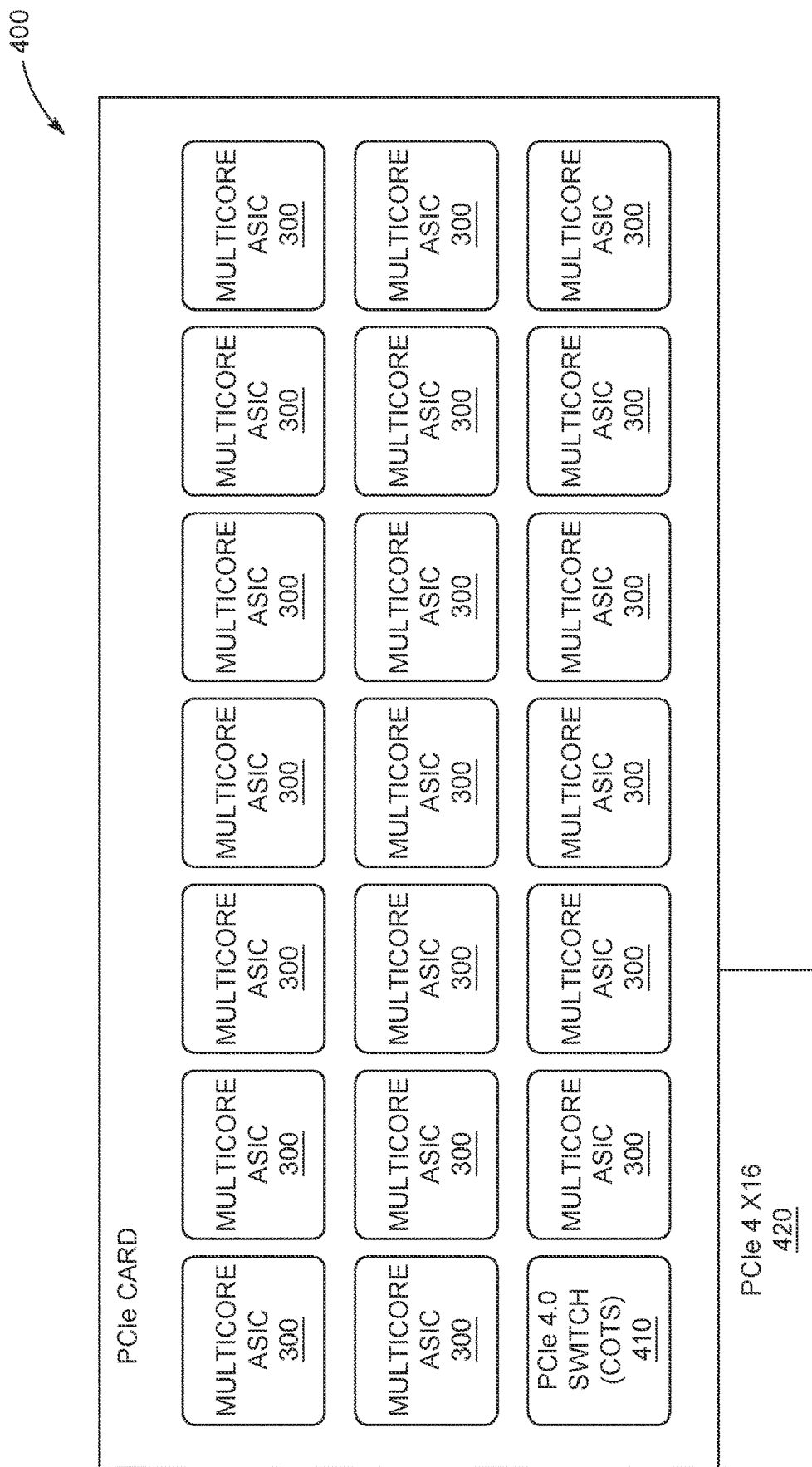
FIG. 4 is a diagram showing a PCIe compatible PC card having a plurality of ASIC chips as shown in FIG. 3.

The ASIC 300 can be part of a processing printed circuit (PC) daughter card 400 constructed according to conventional or custom techniques, and shown FIG. 4. As shown, the exemplary card carries at least 20 ASICs 300 all connected by a common (copper) PCI bus connection using a third party PCIe 4.0 switch. The switch interconnects to a connection tab 420 having a plurality of contact pads (not shown) that interconnect with an appropriate (e.g.) motherboard-based card slot using conventional arrangements. The motherboard can include a main processor or CPU that coordinates overall processing operations and communicates with input/output devices, e.g. displays, graphical user interfaces (GUIs), etc. In this manner, the card 400 can be one of a bank of processors for performing high-overhead operations in a conventional or custom server.

III. Operation

Figure 5:
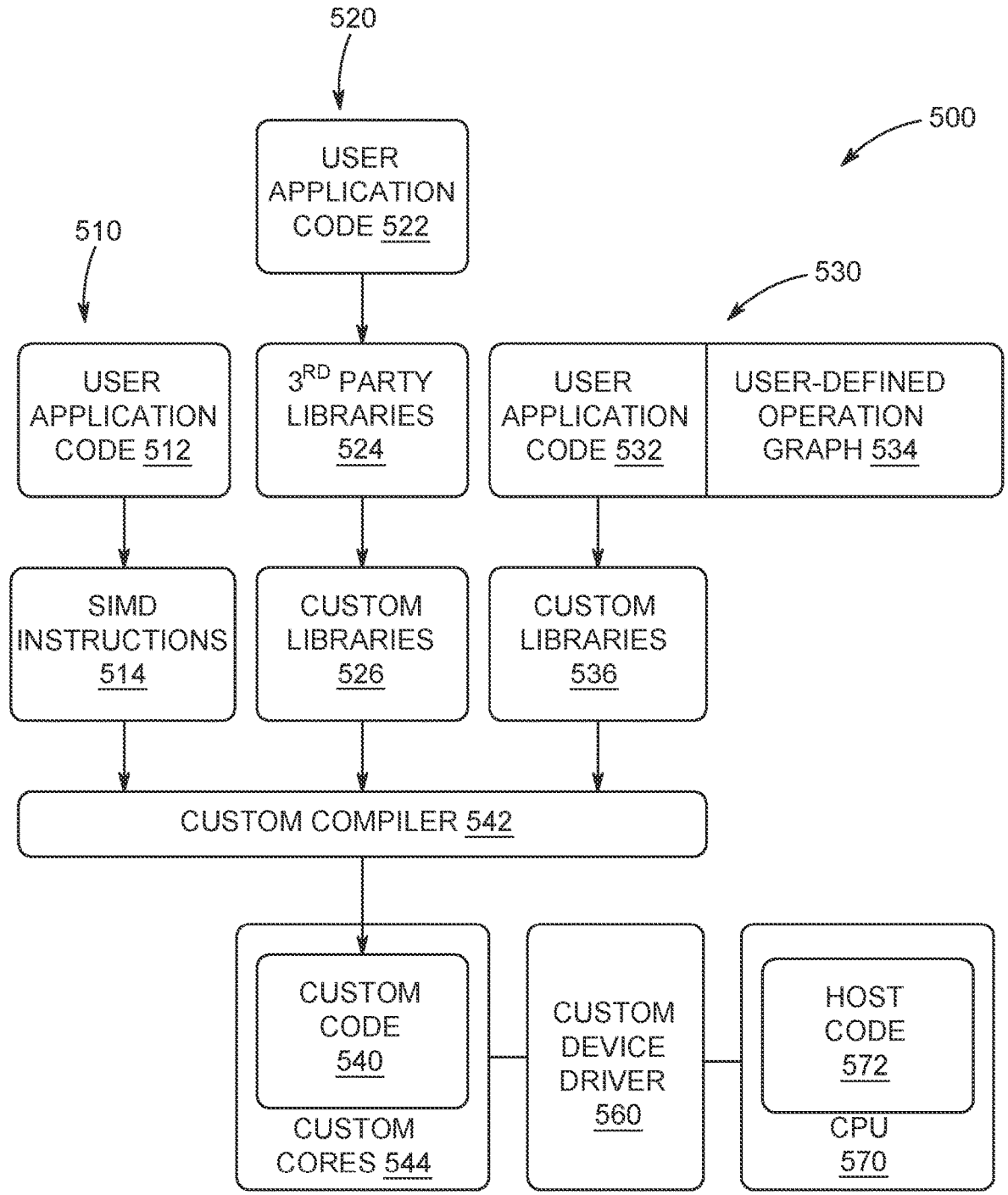
FIG. 5 is a flow diagram showing various exemplary pathways for instruction compilation for use with the multi-core processing arrangement of the illustrative embodiment.

Reference is made to FIG. 5, which shows a varieties of instruction compilation for use with the CPU and processor arrangement according to illustrative embodiments. The first compilation 510 employs SIMD instructions 514 from existing architectures/user application code 512 that are directly translated into an operation graph plus custom code 540, using a custom compiler 542 that adapts the code to the unique architecture of the custom core ASICs 544.

In a second variation 520, based upon user application code 522, third-party libraries 524 are reimplemented in custom code (libraries) 526. These reimplementations serve as drop-in replacements that are acted upon by the compiler 542.

In a third variation 530, programmer users can write programming software code 532 specifically for the exemplary multi-core architecture 544, and design their own custom operation graph 534. The resulting code libraries 536 and graph 534 are provided to the compiler 542. This approach offers the most flexibility and performance, but is slightly less user-compatible with competing architectures.

The custom CPU cores 544 transfer their data through the custom device drivers 550 on the bus architecture to the CPU 570 for the host computer, which operates associated host code 572 adapted to handle data with respect to the cores 544. The host 570 can operate the compiler locally 542 as part of, or in conjunction with, the host code 572.

Figure 6:
FIGS. 6 and 7 are operation graphs for use with the multi-core processing architecture of the illustrative embodiments represented as pseudocode and graphically, depicting data flow in typical operations.
Figure 7:
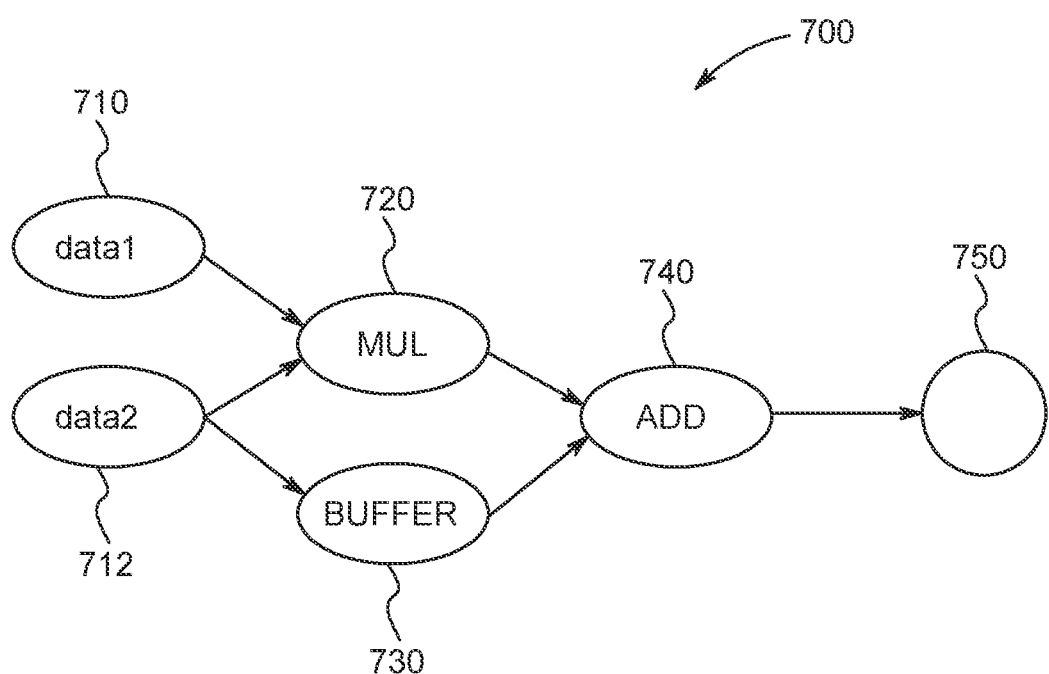

Referring briefly to FIGS. 6 and 7, the basic flow of data through the cores in a typical operation is shown. Hence, FIG. 6 defines a pseudocode representation 600 and FIG. 7 defines a corresponding data graph 700 of the data flow. In particular, in FIG. 7, two datum, data 1 (710) and data 2 (712) are provided to a multiplexer function 720, while data 2 is also provided to a buffer 730. Then, the values of the multiplexer 720 and the buffer are added (740) to generate the final output 750.

By way of further considerations, and as also summarized above, the illustrative embodiment provides a generalized electronic computer architecture with multiple cores, memory distributed amongst the cores (a core-local memory). This arrangement provides predictable, low-latency memory response time, as well as a flexible, code-supplied flow of memory from one specific operation to another (using an operation graph). In one instantiation, the operation graph consists of a set of math operations, each accompanied by an ordered list of one or more input addresses. Input addresses may be specific addresses in memory, references to other math operations in the graph, or references to the next item in a particular data stream, where data streams are iterators through a continuous block of memory. More particularly, according to an exemplary embodiment, the system and method can be arranged so that core-local memory is an "Autonomous Module" as described in the above-incorporated Published PCT application WO 2019/023500 A1. In an embodiment, the arrangement can be substantially free of caches. In general, Autonomous Modules (AM) are a processing arrangement that allow memory banks to be updated independent of processor core operation. A memory value may be updated in the context of an input by sending the input to an AM's autonomous memory operator (AMO). The autonomous memory operator may then fetch the relevant data from the memory bank, update it in the context of the input value, and send the result back to the memory bank. In addition, it may perform an update to other data held in the memory in response to the result of the calculation. Autonomous Modules implemented on e.g. an FPGA can be programmed to carry out myriad different tasks and, unlike GPUs, perform well even when data is not already ordered in memory.

The term "substantially free of caches", as used herein, can be defined as contemplating an architecture that lacks significant and/or purpose-built cache data stores along the bus (or other data-transfer conduit) between processing cores and respective core-local memories (data memories) herein, and more generally, would have storage that is substantially lower in volume than that needed to support data transfer between processor(s) and memory/ies in a current conventional processing and memory architecture. Note that the core-memory pairs defined herein need not be a distinct physical instance, but rather can be on different physical locations on the die and interconnected by a bus therebetween. In many conventional computer processing architecture approximately 90 percent to the on-die transistors are dedicated to cache memory and the substantially cache-free arrangement of the present embodiment(s) eliminates such structures and lowers concomitant power demands or allows for more cores on a given area of die. More particularly, architecture herein advantageously reduces manufacturing costs-per core, in that a substantially cache-free arrangement provides a generally simpler/more-straightforward circuit design, with fewer components and more predictable data flow through the system. This predictability also allows for easier creation of optimal programming code for the architecture herein when compared to a current, conventional cache-reliant system.

As such, local memory is read at L1 cache latencies. The arrangement can also be packaged as a PCIe daughter card, which can be selectively plugged into a host server/PC constructed/organized according to traditional von Neumann architecture. Additionally, the arrangement's compiler can operate on the host's processor. Alternatively, it is expressly contemplated that the compiler can be instantiated and operate in whole or in part on the daughter card(s) that embody the system herein. Code stored and run on the host is used to initiate compilation and computation. Also, operations can be based on an existing (RISC) instruction set. As such, math operations are specified using standards, such as IEEE 754. An operation graph can be communicated to the cores through store operations to specific, pre-reserved false memory addresses. Also, memory content and operations can be communicated to the multi-core processing arrangement from a von Neumann processor through a standard (e.g. PCIe) interface.

In illustrative embodiments, the source of the operation graphs can vary. For example, software converts SIMD operations to operations written in our instruction set. Alternatively, existing APIs (e.g. map-reduce, TensorFlow, NumPy) can be recreated as operation graphs, and users can use the system and method's own APIs as drop-in replacements for existing ones. These implementations can be binary-equivalent, but can run more efficiently due to the advantages of the illustrative system and method.

IV. Conclusion

It should be clear that the above-described multi-core and memory architecture and associated program instructions allows for a highly scalable and robust computing environment that fully utilizes the available power of such parallel designs. This arrangement can be adaptable to existing host computers, using available commercially available bus architectures and card slots—such as PCIe. The arrangement can be fabricated using existing semiconductor and PC board fabrication techniques.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments of the apparatus and method of the present invention, what has been described herein is merely illustrative of the application of the principles of the present invention. For example, as used herein, the terms "process" and/or "processor" should be taken broadly to include a variety of electronic hardware and/or software based functions and components (and can alternatively be termed functional "modules" or "elements"). Moreover, a depicted process or processor can be combined with other processes and/or processors or divided into various sub-processes or processors. Such sub-processes and/or sub-processors can be variously combined according to embodiments herein. Likewise, it is expressly contemplated that any function, process and/or processor herein can be implemented using electronic hardware, software consisting of a non-transitory computer-readable medium of program instructions, or a combination of hardware and software. Additionally, as used herein various directional and dispositional terms such as "vertical", "horizontal", "up", "down", "bottom", "top", "side", "front", "rear", "left", "right", and the like, are used only as relative conventions and not as absolute directions/dispositions with respect to a fixed coordinate space, such as the acting direction of gravity. Additionally, where the term "substantially" or "approximately" is employed with respect to a given measurement, value or characteristic, it refers to a quantity that is within a normal operating range to achieve desired results, but that includes some variability due to inherent inaccuracy and error within the allowed tolerances of the system (e.g. 1-5 percent). Accordingly, this description is meant to be taken only by way of example, and not to otherwise limit the scope of this invention.

What is claimed is:

1. A method for processing data with a multi-core computer processing arrangement comprising:
   providing a plurality of core-memory pairs with, respectively, a plurality of processing cores, each having a discrete, respective, core-local memory associated therewith interconnected for data transfer therebetween; and
   transferring data between each of the processing cores and a core-local memory with switching arrangements and a data bus that interconnect the core-memory pairs to each other, respectively, wherein the core-memory pairs are substantially free of caches for data transferred therebetween;
   operating a code-supplied flow of core-memory pairs from one specific operation to another using an operation graph; and
   defining the operation graph as a set of mathematical operations, each accompanied by an ordered list of one or more input addresses.

2. The method as set forth in claim 1, further comprising, locating at least one of the core-memory pairs on a single die.

3. The method as set forth in claim 1, further comprising, defining the input addresses as specific addresses in memory, references to other math operations in the graph, or references to a next item in a data stream, and iterating data streams through a continuous block of the core-local memory.

4. The method as set forth in claim 3, further comprising, defining the core-memory pairs by an autonomous module arrangement.

5. The method as set forth in claim 1, further comprising, locating at least one of the core-memory pairs on at least one separate die.

6. The method as set forth in claim 1, further comprising, mounting a die containing a plurality of the core-memory pairs on a PCIe daughter card, which is adapted to be selectively plugged into a host server/PC having a host processor constructed according to a traditional von Neumann architecture.

7. The method as set forth in claim 1, further comprising, operating a compiler for program data processed by the core-memory pairs on at least one of (a) one or more of the core-memory pairs and (b) the host processor.

8. The method as set forth in claim 7, further comprising, storing program data with respect to, and operating the program data on, the host processor, to initiate compilation and computation.

9. The method as set forth in claim 7, further comprising, basing operations carried out by the host processor and the core-memory pairs on an existing RISC-based instruction set.

10. The method as set forth in claim 9, further comprising, communication an operation graph to each of the core-memory pairs through store operations to specific, pre-reserved false memory addresses within the core-memory pairs.

11. The method as set forth in claim 1, further comprising, transferring memory content and operations to the each of the core-memory pairs through store operations from a von Neumann processor on a host computer through a standard bus interface.

12. A method for computing comprising:
providing a plurality of processing cores, each having a discrete, respective, core-local memory associated therewith interconnected for data transfer therebetween so as to define a plurality of respective core-memory pairs;
providing switching arrangements and a data bus that interconnect the core-memory pairs to each other for data transfer between each of the processing cores and a core-local memory, respectively, wherein the core-memory pairs are substantially free of caches for data transferred therebetween; and
operating the core-memory pairs based upon an operation graph and a source of the operation graph is based upon (a) program data that converts SIMD operations to operations written in a predetermined instruction set, and (b) existing APIs that are recreated as operation graphs, and for which new APIs are used as drop-in replacements for the existing APIs.

13. The method as set forth in claim 12, further comprising, locating at least one of the core-memory pairs on a single die.

14. The method as set forth in claim 13, further comprising, defining the input addresses as specific addresses in memory, references to other math operations in the graph, or references to a next item in a data stream, and iterating the data streams through a continuous block of the core-local memory.

15. The method as set forth in claim 12, further comprising, defining the core-memory pairs by an autonomous module arrangement.

16. The method as set forth in claim 12, further comprising, locating at least one of the core-memory pairs on at least one separate die.

17. The method as set forth in claim 12, further comprising, mounting a die containing a plurality of the core-memory pairs on a PCIe daughter card, which is adapted to be selectively plugged into a host server/PC having a host processor constructed according to a traditional von Neumann architecture.

18. The method as set forth in claim 17, further comprising, operating a compiler for program data processed by the core-memory pairs on at least one of (a) one or more of the core-memory pairs and (b) the host processor.

19. The method as set forth in claim 17, further comprising, storing program data with respect to, and operating the program data on, the host processor, to initiate compilation and computation.

20. The method as set forth in claim 17, further comprising, basing operations carried out by the host processor and the core-memory pairs on an existing RISC-based instruction set.

* * * * *